Patented June 2, 1953

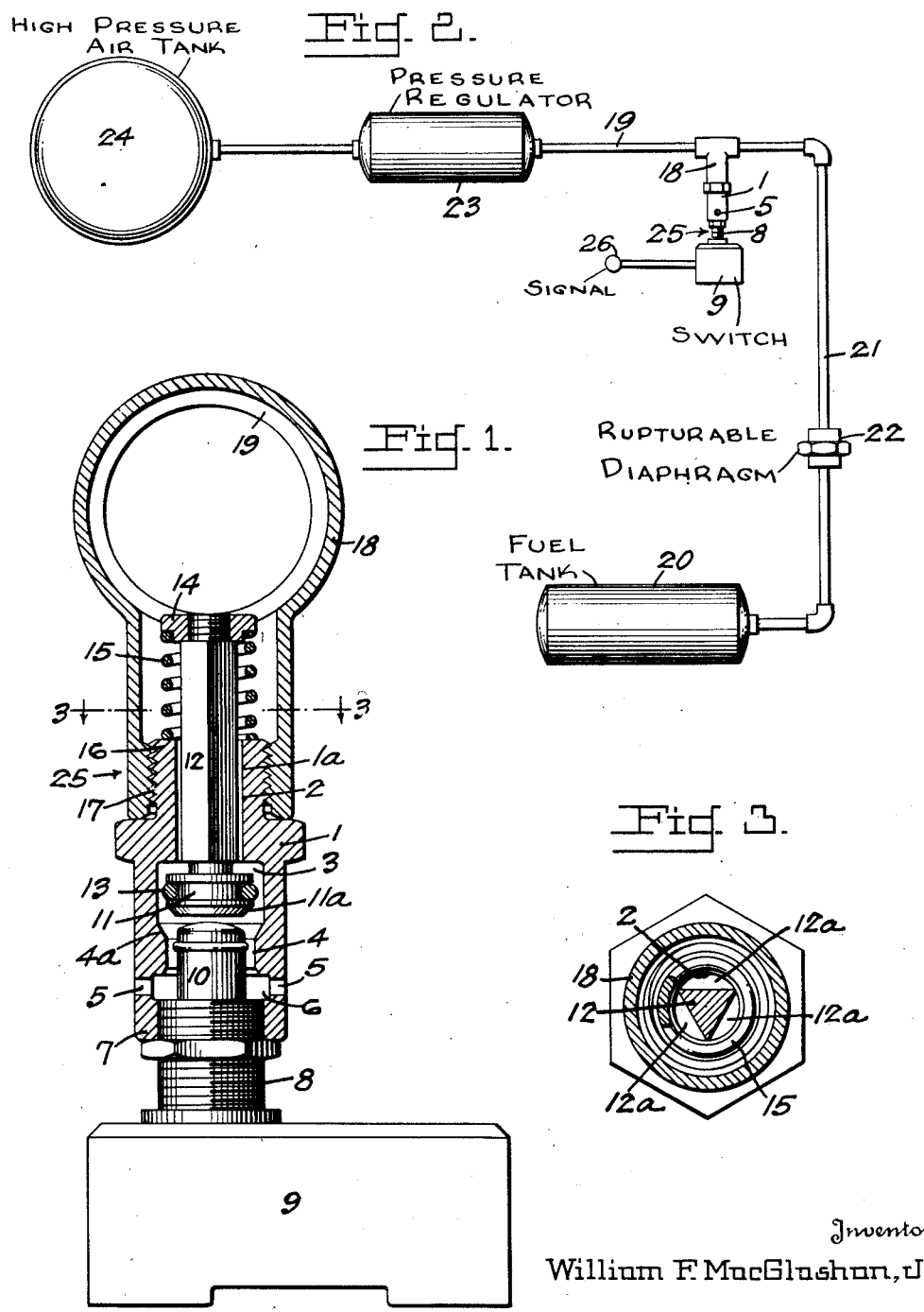

2,640,529

UNITED STATES PATENT OFFICE 2,640,529

AUTOMATIC LOW PRESSURE VENTING AND SIGNALING CHECK VALVE FOR FUEL TANK PRESSURIZING SYSTEMS

William F. MacGlashan, Jr., Alhambra, Calif., assignor to the United States of America as represented by the Secretary of the Army Application August 1, 1950, Serial No. 177,056

4 Claims. (Cl. 158—36.5)

This invention relates to an automatic low pressure venting and signaling check valve.

An object of the invention is a valve primarily for use in a rocket missile in a fuel line, between the fuel tank and a regulator valve which is connected with a pressure tank, to bleed to atmosphere any slight leakage from the line, to operate a signal switch in the event that the leakage exceeds a predetermined value and to seal tight when the line is actually employed in the pressurizing of the fuel tank.

Another object of the invention is a signaling check valve which will prevent accidental premature pressurization of the supply line.

Another object of the invention is a signaling check valve that is extremely simple, compact, light in weight and dependable in performance.

The specific nature of the invention as well as other objects and advantages thereof will clearly appear from the following description and drawings in which:

Fig. 1 is a longitudinal sectional view of the valve connected to the supply line.

Fig. 2 is a diagrammatic view showing the location of the valve in the tank pressurizing system of a rocket missile.

Fig. 3 is a sectional view taken along line 3—3 of Fig. 1.

Referring to the drawings by characters of reference there is shown in Fig. 1 the valve of this invention in which 1 indicates a tubular body, the bore 1a of which forms in sequence a valve stem guide 2, a chamber 3, a cylindrical sealing construction 4 having a bevel comprising a valve seat 4a, and an internal channel 6 which communicates with the lateral ports 5 formed in the walls of the body adjacent its switch receiving end 7. The end 7 is internally threaded to receive the sleeve 8 of the switch 9. The switch stem 10 slidably housed in the sleeve 8 protrudes into the chamber 3 and is in operable contact with the piston 11 in the chamber 3.

The valve stem guide 2 receives a valve stem 12, preferably made triangular in cross section in order to provide passageways 12a between the stem and guide. The inner end of the valve stem is provided with a piston 11 having a seal ring 13 thereon. The dimensions of the chamber 3 are such that the seal ring clears the walls of the chamber by amount sufficient to permit a limited quantity of fluid to bypass the piston and to flow through the lateral ports 5 without moving the piston. A predetermined greater flow, however, will urge the piston to seat the ring 13 on the beveled approaches 4a, which is so proportioned that upon entrance of the piston into this part of the valve body, the chamber 3 is sealed from the lateral ports 5.

The extended end of the valve stem 12 is provided with a collar 14. A spring 15 is positioned around the valve stem between the collar 14 and the adjacent end 16 of the body 1. The normal length of this spring is such that without compression of the spring, the piston and ring occupy a non-sealing position within the chamber 3.

The end of the body 1 in the region of the stem guide 2 is externally threaded as indicated by the reference numeral 17 and is in threaded engagement with a fitting 18 provided in the fuel line 19.

Fig. 2 illustrates an application of the automatic valve of Fig. 1. Contained in a rocket missile, not shown, is a tank 20 filled with one of the propellent components. This tank is connected by a fuel line 21 containing a rupture diaphragm 22 to a pressure regulator 23, which in turn communicates with a high-pressure air tank 24. The pressure venting and signaling valve, as generally indicated by the reference numeral 25, is interposed between the pressure regulator and the rupture diaphragm. The purpose of the diaphragm is to prevent back flow of the contents of or fumes from the tank 20. During the time interval required for pressurizing the air tank 24 and that required before the missile can be fired, it is essential the rupture diaphragm not be broken. In event of slight leakage through the pressure regulator, the air is vented through the automatic valve around the piston 11 and out through the lateral ports 5. Should the volume of leakage exceed a predetermined nominal amount, a pressure differential is established across the piston because of the restricted flow around the sealing ring 13. This pressure differential is sufficient to depress the piston which then contacts switch stem 10 to close the switch 9, which actuates a warning signal 26, informing interested personnel to remove the air in the tank 24 before the pressure in the line 21 becomes great enough to rupture the diaphragm 22. When it is desired to pressurize the tank 20, the pressure regulator is opened, the resulting air pressure in line 21 being sufficient to depress the piston and cause the seal ring 13 to contact seat 4a in sealing relationship. As long as adequate pressure is maintained in the supply line, the ring 13 maintains sealing relationship with the seat 4a.

I claim:

1. A system for pneumatically pressurizing a fuel tank comprising a high pressure air tank, a fuel tank, a conduit connecting said fuel tank and said air tank, a pressure regulator interposed in said conduit adjacent said air tank, a flow inhibiting diaphragm in said conduit adjacent said fuel tank rupturable at a predetermined high pressure, and an automatic venting and signaling control valve in said conduit intermediate said pressure regulator and said diaphragm, comprising an elongated housing having an inlet communicating with said conduit and an outlet to atmosphere, means forming a valve chamber in said housing adjacent said outlet and having a beveled surface facing said chamber to form a valve seat, a differential pressure responsive piston valve in said chamber adapted to seat upon said beveled surface and having an elongated stem extending into said valve housing, signaling means disposed exteriorly of and adjacent to said valve housing adapted to cooperate with said piston valve, and resilient means in said elongated housing about said valve stem biasing said piston valve into open position away from said valve seat in response to a predetermined low pressure in said conduit to vent said conduit, said piston valve being movable towards valve seating position and into position to actuate said signaling means in response to pressures in said conduit intermediate said low pressure and said predetermined high pressure, and also movable in response to said predetermined high pressure to engage said valve seat and to close said venting outlet, whereby said diaphragm is ruptured.

2. A system for pneumatically pressurizing a fuel tank comprising a high pressure air tank, a fuel tank, a conduit connecting said fuel tank and said air tank, a pressure regulator interposed in said conduit adjacent said air tank, a flow inhibiting diaphragm in said conduit adjacent said fuel tank rupturable at a predetermined high pressure, and an automatic signaling check valve assembly in said conduit intermediate said pressure regulator and said diaphragm including means defining an elongated housing having an inlet communicating with said conduit and an outlet to atmosphere, a valve chamber intermediate said inlet and outlet, an elongated valve stem chamber between said inlet and said valve chamber, a valve seat facing the valve chamber and communicating with said outlet, a flow check valve assembly including a stem having a triangularly shaped cross section slidable in said stem chamber and forming therewith passages communicating with said inlet and said valve chamber, said stem at one end supporting a piston in said valve chamber, said valve stem having a portion extending exteriorly of the inlet end of said housing, a cap affixed to the end of said portion, a helical spring mounted on said portion between said cap and one end of said housing to bias said piston into open position away from said valve seat in response to a low pressure in said conduit, an electrical signal switch fitted in the opposite end of said housing adjacent said outlet, the switch having a switch stem and in cooperative relation to said piston, said piston overcoming the resistance of said spring in response to pressures in said conduit intermediate said low pressure and said high pressure to contact said switch stem and close said switch, said piston being also movable in response to said predetermined high pressure to engage said valve seat to close said outlet, whereby said diaphragm is ruptured.

3. A system for pneumatically pressurizing a fuel tank comprising a high pressure air tank, a fuel tank, a conduit connecting said fuel tank and said air tank, a pressure regulator interposed in said conduit adjacent said air tank, a flow inhib-iting diaphragm in said conduit adjacent said fuel tank rupturable at a predetermined high rate of flow, and an automatic signaling check valve in said conduit intermediate said pressure regulator and said diaphragm including an elongated housing having an inlet at one end communicating with said conduit and an outlet to atmosphere adjacent its opposite end, a valve chamber intermediate said ends, a valve stem chamber extending through said housing from said one end to said valve chamber, a valve seat facing the valve chamber and communicating with the outlet, a flow check valve assembly including a stem having a triangularly shaped cross section slidable in the stem chamber and forming with the walls of the stem chamber passages, said passages communicating the inlet with the valve chamber, a piston in said valve chamber supported by one end of the valve stem, a seal ring mounted on said piston and having its periphery spaced from the wall of the valve chamber to permit fluid to bypass the piston at a predetermined low rate of flow, the opposite end of said valve stem extended exteriorly of said inlet and having a cap fixed thereon, a spring on said valve stem positioned between said cap and said inlet biasing said piston into low rate of flow position, an electrical switch having its stem projecting into the valve chamber in axial alignment with said valve stem positioned in said opposite end, said piston moving downward in the valve chamber and contacting said switch stem to close said switch upon a rate flow intermediate said low rate of flow and said predetermined high rate of flow, said piston upon increase to said high rate of flow moving further downward in said valve chamber to seat said seal ring, said spring urging said piston upward in the valve chamber to open said valve and release said switch upon a decrease of flow to said low rate.

4. A system for pneumatically pressurizing a fuel tank comprising, a high pressure air tank, a fuel tank, a conduit connecting said fuel tank and said air tank, a pressure regulator interposed in said conduit adjacent said air tank, a flow inhibiting diaphragm in said conduit adjacent said fuel tank rupturable at a predetermined high pressure, and a differential pressure responsive automatic venting and air flow control valve in said conduit intermediate said pressure regulator and said diaphragm, said valve comprising an elongated housing having one end communicating with said conduit, and the other end open to atmosphere, a valve member in said housing movable from first position to vent said conduit to second position closing said end open to atmosphere, resilient means biasing said valve member into open position below said predetermined high pressure, said valve member movable to closed position in response to pressure above said predetermined high pressure, whereby said diaphragm is ruptured.

WILLIAM F. MacGLASHAN, Jr.

References Cited in the file of this patent

UNITED STATES PATENTS

| Number | Name | Date |
|---|---|---|
| 1,675,849 | Fultz | July 3, 1928 |
| 1,900,229 | Dennis | Mar. 7, 1933 |
| 2,093,015 | Madden | Sept. 14, 1937 |
| 2,204,757 | Henze | June 18, 1940 |
| 2,307,949 | Phillips | Jan. 12, 1943 |
| 2,402,826 | Lubbock | June 25, 1946 |
| 2,554,390 | Stevenson | May 22, 1951 |